UNITED STATES PATENT OFFICE 2,479,441

3,5-DIAMINO-4-DIHYDRO-THIADIAZINE-1-DIOXIDE

Henry A. Walter, Longmeadow, Mass., assignor to Monsanto Chemical Company, St. Louis, Mo., a corporation of Delaware No Drawing. Original application August 6, 1947, Serial No. 766,893, now Patent No. 2,454,262, dated November 16, 1948. Divided and this application May 15, 1948, Serial No. 27,367

5 Claims. (Cl. 260—67.6)

This invention relates to resinous materials made from 3,5-diamino-4-dihydro-thiadiazine-1-dioxide.

One object of this invention is to provide resinous reaction products of 3,5-diamino-4-dihydro-thiadiazine-1-dioxide and aldehydes.

A further object is to provide resinous reaction products of 3,5-diamino-4-dihydro-thiadiazine-1-dioxide, aldehydes and alcohols.

These and other objects are attained by reacting 3,5-diamino-4-dihydro-thiadiazine-1-dioxide with aldehydes with or without further reaction with alcohols.

3,5-diamino-4-dihydro-thiadiazine-1-dioxide may be prepared by the reaction between sulfamide and malononitrile as disclosed and claimed in my copending application Serial No. 766,893 filed August 6, 1947 and now Patent No. 2,454,262, November 16, 1948, of which this application is a division. The compound has the following structural formula.

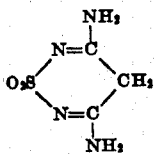

The following examples are given in illustration of this invention and are not intended as limitations thereof. Where parts are mentioned, they are parts by weight.

Example I 1 mol of 3,5-diamino-4-dihydro-thiadiazine-1-dioxide was mixed with 4 mols of formalin (37% formaldehyde). The mixture was adjusted to a pH of about 8-9 with aqueous sodium hydroxide and then heated at reflux at atmospheric pressure for about 30 minutes. The reaction product was dehydrated under vacuum to yield a product which, on analysis, proved to be the tetramethylol derivative of 3,5-diamino-4-dihydro-thiadiazine-1-dioxide.

The reaction product was soluble in alcohols and water. It could be cured to the insoluble, infusible state by heating it for a short time at elevated temperatures.

The formaldehyde shown in Example I may be replaced in part or in whole by other aldehydes including acetaldehyde, propionaldehyde, butyraldehyde, isobutyraldehyde, octaldehyde, benzaldehye, crotonaldehyde, cinnamaldehyde, furfural, etc. The amount of aldehyde to be used may vary from 1 to 4 mols per mol of 3,5-diamino-4-dihydro-thiadiazine-1-dioxide. An excess of aldehyde may be used, if desired, the excess being recovered by distillation upon completion of the reaction.

The condensation reaction may be carried out at reflux temperature at atmospheric pressure or at temperatures as much as 50° C. below reflux. The pH of the reaction medium should be adjusted to about 8-9 and maintained at about 8-9 throughout the reaction, using an alkali such as sodium or potassium hydroxide, triethanolamine, barium hydroxide, or other alkalies or alkaline reacting compounds as regulating media.

The reaction products are recovered by distillation under vacuum, by oven drying, spray drying, or other conventional means.

The reaction products are soluble in water and alcohols and are fusible. They may be cured to an insoluble, infusible product by heating them at temperatures ranging from about 100° C. to about 200° C. for a short period of time, i. e., about 10 to about 30 minutes. No catalyst need be used to accelerate the curing, but acid curing catalysts such as benzene sulfonic acids may be used if desired to shorten the curing time or lower the curing temperature, or both.

The aldehyde condensation products of 3,5-diamino-4-dihydro-thiadiazine-1-dioxide may be mixed with fibrous or granular fillers, pigments, dyes, lubricants, etc. to provide molding powders which produce articles which are exceptionally tough and resilient.

The aldehyde condensation products may be further reacted with alcohols to provide surface coating and textile treating resins. This etherification reaction may be carried out as follows:

Example II 1 mol of tetramethylol-3,5-diamino-4-dihydro-thiadiazine-1-dioxide was dissolved in 6 mols of methanol. The solution was made acid with formic acid and then heated at reflux temperature at atmospheric pressure for about 1 hour. The product of the reaction was a methanol solution of the tetramethyl ether of tetramethylol 3,5-diamino-4-dihydro-thiadiazine-1-dioxide. The excess methanol was removed by distillation to yield a slightly yellow liquid resin.

The methanol of Example II may be replaced in whole or in part by other monohydric alcohols including ethanol, propanol, isopropanol, butanol, pentanols, 2-ethylhexanol, stearyl alcohol, cetyl alcohol, etc. The amount of alcohol used will depend somewhat on the number of alkylol groups introduced during the aldehyde condensation step. In general, the amount of alcohol used will be at least as great on a molar basis as the amount of aldehyde used. Preferably, an excess of alcohol is used to act as a solvent during and after the reaction. The amount of alcohol used thus will vary from about 1 to 4 or more mols per mol of the aldehyde condensation product of 3,5-diamino-4-dihydrothiadiazine-1-dioxide.

The etherification reaction is preferably carried out at the reflux temperature at atmospheric pressure, but may be carried out at temperatures substantially lower than reflux especially if high boiling alcohols are used. In some cases, it is advantageous to carry out the etherification reaction at temperatures as low as 20° C.–40° C.

The pH of the etherification reaction mixture should be adjusted to below 7 and preferably from about 5 to 7. Various acids may be used as pH regulating means such as sulfuric, formic, acetic, acrylic, etc., acids. The ether resins may also be made by the simultaneous reaction between the aldehyde, the alcohol and the 3,5-diamino-4-dihydro-thiadiazine-1-dioxide at a pH of about 5–7.

The products of the reaction between alcohols and the aldehyde condensation products of 3,5-diamino-4-dihydro-thiadiazine-1-dioxide are light colored liquids. They are soluble in alcohols and aromatic hydrocarbons such as benzene, toluene, xylene, etc. The resins may be used alone or in conjunction with fillers, pigments, dyes, natural and synthetic resins, etc., as surface coating materials and may be hardened on coated surfaces at temperatures ranging from 100 to 200° C. with or without a curing catalyst to provide hard, tough coatings.

The ether resins may also be used to treat various textiles to creaseproof and shrinkproof them. Their property of curing rapidly at relatively low temperatures without the aid of an acid catalyst makes them especially desirable for treating textiles.

The ether resins may also be used to modify alkyd resins to increase the toughness of the latter.

It is obvious that many variations may be made in the processes and products of this invention without departing from the spirit and scope thereof as defined in the appended claims.

What is claimed is:

1. A resinous condensation product of an aldehyde and 3,5-diamino-4-dihydro-thiadiazine-1-dioxide.

2. A resinous condensation product of formaldehyde and 3,5-diamino-4-dihydro-thiadiazine-1-dioxide.

3. A reaction product of an aldehyde and an alcohol with 3,5-diamino-4-dihydro-thiadiazine-1-dioxide.

4. A reaction product of formaldehyde, an alcohol and 3,5-diamino-4-dihydro-thiadiazine-1-dioxide.

5. A reaction product of formaldehyde, methanol and 3,5-diamino-4-dihydro-thiadiazine-1-dioxide.

HENRY A. WALTER.

No references cited.